United States Patent [19]
Planta et al.

[11] Patent Number: 5,590,015
[45] Date of Patent: Dec. 31, 1996

[54] VARIABLE CAPACITOR HAVING SAFETY END SWITCHES DISPOSED ON AN ADJUSTABLE SCREW AT END FACE OF CAPACITOR HOUSING

[75] Inventors: Andrea V. Planta, Oetwil; Rolf Gerber, Kehrsatz, both of Switzerland

[73] Assignee: Comet Technik AG, Liebefeld, Switzerland

[21] Appl. No.: 561,005

[22] Filed: Nov. 21, 1995

[30] Foreign Application Priority Data

Nov. 21, 1994 [CH] Switzerland ............... 3503/94

[51] Int. Cl.⁶ .................................. H01G 5/00
[52] U.S. Cl. .................. 361/277; 361/289; 361/279
[58] Field of Search .................. 361/277, 287, 361/289, 293, 299.4, 296, 275.4, 279, 298.5, 300; 29/25.42; 200/17 R, 18, 600

[56] References Cited

U.S. PATENT DOCUMENTS 3,447,047  3/1968  Lindsay ................... 361/289
4,035,697  7/1977  Arnold, Jr. ............... 361/289

FOREIGN PATENT DOCUMENTS 656740  7/1986  Switzerland.

OTHER PUBLICATIONS

Service Bulletin–Comet Technik, 1993–14–Jul., "Variable Capacitor Cooling".

*Primary Examiner*—Michael W. Phillips
*Assistant Examiner*—Anthony Dinkins
*Attorney, Agent, or Firm*—Marks & Murase L.L.P.

[57] ABSTRACT

The variable capacitor (1) is characterized by the fact that the safety end switches (6, 7) as well as a displacement detector (10) are integrated in the housing (1) or in an additional housing (5) provided at one of the front ends of the capacitor housing (1). Due to this construction, the entire device becomes more compact and more precise in operation.

9 Claims, 1 Drawing Sheet

VARIABLE CAPACITOR HAVING SAFETY END SWITCHES DISPOSED ON AN ADJUSTABLE SCREW AT END FACE OF CAPACITOR HOUSING

BACKGROUND OF THE INVENTION

The present invention refers to a variable capacitor, in particular a vacuum capacitor, in which stationary capacitor disks and capacitor disks which are linearly displaceable with respect to the former ones and disposed on a motor-driven screw are accommodated in a housing, and safety end switches and a position indicator device are associated to the displaceable capacitor disks.

Prior embodiments of variable capacitors of this type, which are generally used in HF technique, medical technique, and the like, have already been provided with safety end switches which are coupled to the movement of the displaceable capacitor disks in one way or another. The purpose of such end switches is to limit the movement of the displaceable portion of the capacitor on both sides. It is also known to provide such capacitors with position indicators which are disposed in parallel to the proper capacitors. Like the adjusting screw itself, they are driven by a gearwheel or a belt drive acting on an adjusting screw.

However, such capacitors having a drive, a position indicator, and end switches are not only unhandy and bulky, but also relatively unprecise because of the unavoidable play of the drive, which is why they cannot provide the reproducibility which may be desired in certain cases.

SUMMARY OF THE INVENTION

It is thus an object of the present invention to provide a variable capacitor having safety end switches and a position indicator device which is much less space-consuming than prior embodiments, more precise in operation, and nevertheless simple in construction.

This object is attained in a variable capacitor according to the introduction wherein the position indicator and the safety end switches are disposed on the adjusting screw at one of the end faces of the capacitor housing in a portion of said housing itself or in an additional flange-mounted housing.

Particular embodiments of the invention are defined in the dependent claims.

The embodiment where the driving motor is placed directly on the adjusting screw is especially space-saving. However, the mere integration of the position indicator and the safety end switch in the housing itself or in an axial supplement thereof already provides substantial advantages with respect to prior embodiments.

BRIEF DESCRIPTION OF THE DRAWINGS

The invention is explained in more detail hereinafter with reference to an embodiment which is illustrated in the drawing, wherein.

DETAILED DESCRIPTION OF THE INVENTION

Figure 1:
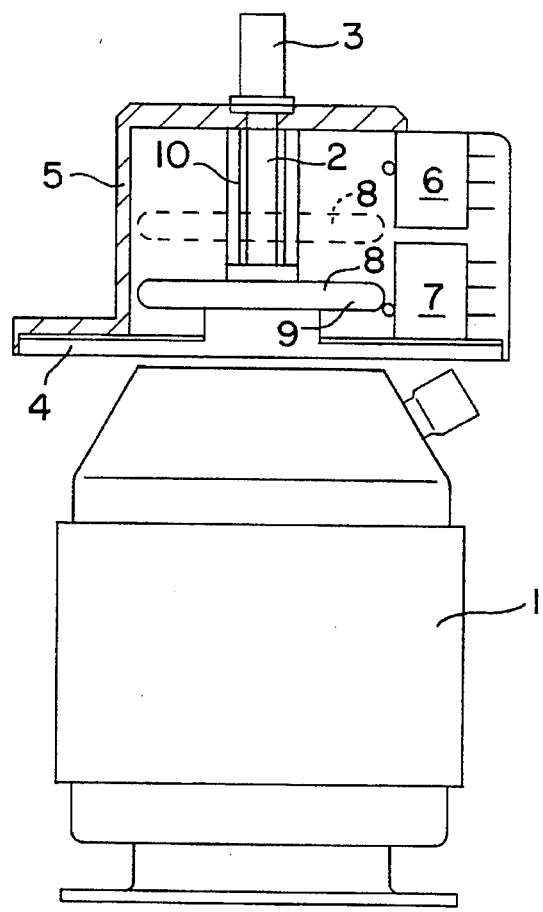
FIG. 1 shows a variable capacitor of the invention with a housing compartment containing the end switch and the position indicator.
Figure 2:
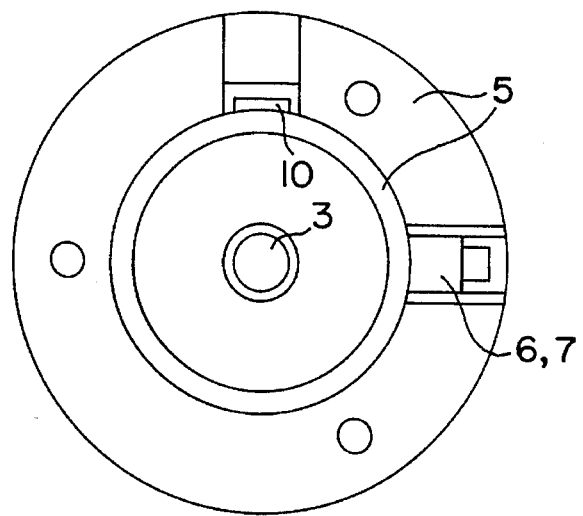
FIG. 2 shows a front view of the capacitor of FIG. 1.

FIGS. 1 and 2 of the drawing show the housing 1 of a standard vacuum capacitor containing, in a known manner, stationary capacitor disks in the form of concentrical ring disks, on one hand, and further capacitor disks, on the other hand, which are insertable in the former ones by linear displacement in order to adjust the capacity of the capacitor as desired. The inside of the housing is normally under vacuum. The displaceable disks are diplaced by means of an adjusting screw 2 by a motor (not shown) which acts upon end portion 3 of screw 2 through a gear.

Hitherto, a position indicator disposed in parallel to capacitor 1 has also been driven by screw 2, 3. According to the invention, an additional housing 5 is now flange-mounted to the end face of capacitor 1 by flange 4, the end of screw 2 passing therethrough. Housing 5 accommodates two adjustable safety end switches 6, 7 which are commutated in the two end positions of the capacitor by means of an actuating member 8 having an actuating finger 9 whose movement on screw 2 is coordinated with that of the capacitor disks.

Screw 2 is also provided with a linear potentiometer whose linear section 10 serves as a position indicator.

Instead of a linear potentiometer, an optical or an opto-electric measuring device cooperating with screw 2 might be provided as well.

Basically, it is also possible to place the driving motor for screw 2 directly on screw end portion 3 in order to obtain an even more compact design.

We claim:

1. A variable capacitor, in particular a vacuum capacitor, in which stationary capacitor disks and capacitor disks which are linearly displaceable with respect to said stationary capacitor disks; and disposed on a motor-driven screw are accommodated in a housing, and safety end switches and a position indicator device are associated to the displaceable capacitor disks, wherein the position indicator and the safety end switches are disposed on an adjusting screw at one of the end faces of the capacitor housing in a portion of said housing itself or in an additional flange-mounted housing.

2. The variable capacitor of claim 1, wherein the end switches for both end positions of the displaceable capacitor disks are disposed at a radial distance from the screw outside the proper capacitor housing, and further including a member which is displaceable on the adjusting screw along with the displaceable disks is provided with an actuating finger which projects outwardly between the end switches.

3. The variable capacitor of claim 1, wherein the position of the end switches is adjustable.

4. The variable capacitor of claim 1, wherein the position indicator device comprises an optical display whose movement is coordinated with that of the displaceable capacitor disks.

5. The variable capacitor of claim 1, wherein the position indicator device comprises a displacement detector, which cooperates with at least one of the adjusting screw and the displaceable capacitor disks in a coordinated manner.

6. The variable capacitor of claim 1, wherein the adjusting screw projects from the proper capacitor housing on one side, an end portion of the screw being adapted to being driven by a motor, and means for actuating the safety end switches and the position indicator being disposed between the proper capacitor housing and said driving portion of the screw.

7. The variable capacitor of claim 1, wherein the motor for the drive of the adjusting screw is disposed in the prolongation of the screw axle or on the latter.

8. The variable capacitor of claim 1, wherein the housing elements are made of an electrically insulating material.

9. The variable capacitor of claim 5, wherein said displacement detector is a linear potentiometer.

* * * * *